United States Patent [19]

Merriam

[11] 3,824,350

[45] July 16, 1974

[54] ACCESS CIRCUIT FOR SHARED TELEPHONE EQUIPMENT

[75] Inventor: Donald R. Merriam, Rochester, N.Y.

[73] Assignee: Stromberg-Carlson Corporation, Rochester, N.Y.

[22] Filed: May 4, 1973

[21] Appl. No.: 357,297

[52] U.S. Cl. .......... 179/18 AB
[51] Int. Cl. .......... H04q 3/00
[58] Field of Search .......... 179/18 AB

[56] References Cited

UNITED STATES PATENTS

| | | | |
|---|---|---|---|
| 3,210,478 | 10/1965 | Klees et al. | 179/18 AB |
| 3,430,000 | 2/1969 | Rohrig | 179/18 AB |

*Primary Examiner*—William C. Cooper
*Attorney, Agent, or Firm*—Charles C. Krawczyk; William F. Porter, Jr.

[57] ABSTRACT

An access circuit is provided for completing a connection to an idle piece of shared call processing equipment which has a status indication circuit which indicates the busy-idle condition of the shared equipment. The access circuit shapes a request-for-service pulse which is applied thereto to permit switching components in the access circuit to definitively select a single idle piece of shared equipment to which to complete the connection and, when the idle piece of shared equipment has been selected, the access circuit immediately transmits a signal to the status indication circuit to indicate a busy condition for the selected piece of shared equipment.

10 Claims, 3 Drawing Figures

ACCESS CIRCUIT FOR SHARED TELEPHONE EQUIPMENT

BACKGROUND OF THE INVENTION

This invention relates in gereral to telephone systems and in particular to an access circuit for completing a connection to shared call processing equipment which is idle.

Quite often — because of practical requirements and economical limitations — some types of equipment in a telephone system are provided in substantially smaller quantities than other types of equipment — for example when one of the latter types of equipment (hereinafter called "primary equipment") must be utilized for processing each call which enters the system (for example, a recording trunk in a toll ticketing system) or for relatively long portions or all of some calls. The former types of equipment — for example, a multifrequency detector circuit in a toll ticketing system — generally are employed only briefly, if at all, during a particular call or only during relatively few calls.

Therefore, types of equipment which are provided in smaller numbers must be shared by the primary equipment, and it is necessary to provide a mechanism whereby each type of primary equipment may, when required, be quickly and reliably connected to a piece of shared equipment which is not then in use.

In shared equipment telephone systems currently in use, each piece of shared equipment has a status indication circuit for indicating the busy-idle status of that piece of shared equipment and each of the types of primary equipment which may be connected to a piece of shared equipment has an access circuit which samples the status indication circuit associated with that shared piece of equipment. If the access circuit detects that the shared equipment is idle, the access circuit completes a connection between the piece of primary equipment and the piece of shared equipment. Heretofore, the status indication circuits which have been utilized with shared equipment have consisted of an output terminal connected to a battery via a resistor of a predetermined size. When the shared equipment is idle, the output terminal is effectively connected to an external open circuit, no current flows through the resistor and the potential at the output terminal is substantially equal to the battery output potential (typically −48 volts). When an access circuit samples the voltage at the output terminal, the magnitude of the potential present is sufficient to energize one or more relays in the access circuit which then completes a connection between the primary equipment and the shared equipment.

When a piece of shared equipment is busy, the output terminal in the status indication circuit has already been connected to an access circuit and the current flowing into the relays in the access circuit causes a voltage drop across the resistor in the status indication circuit which reduces the potential at the output terminal to approximately one-half (−24 volts) of the battery potential. When a second access circuit attempts to complete a connection to the shared equipment and samples the potential at the output terminal, the −24 volt potential present thereon is insufficient to energize the one or more relays in that second access circuit and the connection is made instead to a free piece of shared equipment — if one exists — which may be accessed by that second access circuit.

Although existing status indication circuits generally function satisfactorily, they suffer from two serious drawbacks. First, two access circuits occasionally sample a status indication circuit simultaneously or substantially simultaneously. If the shared equipment, with which the status indication circuit is associated, is idle, a −48 volt potential is present on the output terminal of the status indication circuit and both access circuits, upon receiving the idle indication, will attempt to complete connections to the same piece of shared equipment. This results in a so-called "double-connect" and, therefore, two telephone calls are not completed.

Such simultaneous connections, although relatively infrequent, are annoying to the subscriber when they do occur and often necessitate hanging-up and redialing the calls. Even if the calling subscriber decides to complete his call, the presence of an unexpected third party on the line is generally undesirable. The occurrence of "double-connects" is also undesirable from the point of view of the telephone company. Company switching equipment receives unnecessary wear if a call is not successfully completed on the first attempt and must be retried. In addition, the proper operation of billing or other call processing equipment may be rendered impossible when two calls are inadvertently connected together.

The second major drawback of existing status indication circuits has been that the potential present at the output terminal which is sampled by the access circuit has varied as a function of the current flowing through the output terminal and a resistor connected in series therewith into a connected access circuit and, therefore, varies as a function of the impedance of the access circuit. Since access circuits have generally utilized at least one relay, corresponding to each piece of shared equipment to which the access circuit may complete a connection, to complete a given connection, each access circuit is provided with at least two relays with their respective settings marginally adjusted to insure that only one of the relays becomes energized when the access circuit is requested to complete a connection and more than one of the pieces of shared equipment to which the access circuit may complete a connection is idle. In order for such marginally adjusted relays to function satisfactorily, the voltage which is applied thereto must remain substantially constant for busy or idle indications in order to eliminate duplicate energization or failure to energize any of the relays. Consequently, in systems in which the potential at the output terminal of the status indication circuits has fluctuated over a period of time, it has been necessary periodically to readjust the relay settings in the access circuits with resultant temporary down time for the access circuits and associated equipment and expenditure of manpower, time and money. Furthermore, in systems in which the potential at the output terminals of the status indication circuits fluctuates, it has been difficult to take advantage of current advances in technology such as printed card circuits, since it is extremely difficult, if not impossible, to adjust the printed circuit elements once they have been installed.

In my copending patent application Ser. No. 357,320, filed concurrently herewith, entitled, "Status Indication Circuit For Shared Telephone Equipment" and assigned to the assignee of the present invention, I have disclosed a novel status indication circuit for shared telephone circuits which overcomes the above-mentioned drawbacks. First, the status indication circuit disclosed in the above-referenced application includes threshold switching circuitry which overrides the conventional indicating circuitry when two or more access circuits attempt to complete connections simultaneously or substantially simultaneously to the piece of shared equipment. The threshold switching circuitry drives the potential on the output terminal of the status indication circuit to ground potential and thereby prevents any of the access circuits from completing their connections during such simultaneous attempts. In addition, the status indication circuit which I have invented includes a zener diode in parallel with the resistor which is in the line to the output terminal and the breakdown voltage of the zener diode controls the difference between the potential on the output terminal when the shared equipment is idle and the potential on the output terminal when the shared equipment is busy. In the latter case (in the disclosed embodiment) the potential on the output terminal is maintained substantially constant at −24 volts and is independent of the impedance of the access circuit which is connected to the shared equipment.

The status indication circuit disclosed in my copending application does not, however, overcome several other problems which may exist in telephone systems utilizing shared call processing equipment. Existing access circuits have several deficiences. First, those access circuits rely on at least one relay to become operatively energized (after an idle piece of shared equipment has been detected) before the necessary switching to complete the desired connection takes place. The current drawn by the relay coil flows via the output terminal and resistor in the output line of the status indication circuit and, therefore, the potential at the output terminal does not drop to −24 volts for approximately 15 to 20 milliseconds. If during that time delay, another access circuit attempts to complete a connection to the same piece of shared equipment, the magnitude of the voltage at the output terminal of the status indication circuit may be sufficiently great to energize a relay in the second access circuit and — if a conventional status indication circuit is in use — a "double-connect" results.

A second deficiency which is present in conventional access circuits is the inability of marginally adjusted relays to select definitively a single idle piece of shared equipment to which to complete a connection. Typically, conventional access circuits employ individual relays (or chains of relays) connected to the status indication circuits for individual pieces of shared equipment. The relays are marginally adjusted so that each will become energized at a slightly different voltage from that at which the others will become energized. The relays which are connected to status indication circuits associated with idle pieces of shared equipment have one side at a potential of approximately −48 volts; the other relays have the corresponding side at a potential of approximately −24 volts. When a piece of primary equipment requests service from the access circuit, the primary equipment transmits a ground pulse to the other side of each relay. Those relays which have one side connected to a −24 volt potential will remain deenergized. However, those relays which have one side connected to a −48 volt potential (and which are marginally adjusted to become energized when a voltage in the range of 35 to 45 volts is impressed across them) suddenly have a 48 volt difference impressed across them and all begin to become energized. Finally one of the relays does become operatively energized and the others eventually settle down. As is apparent, the conventional construction of access circuits results in undesirable time delays and wear on circuit components.

Accordingly, it is an object of the present invention to provide a new and improved access circuit which eliminates such unnecessary time delay and wear on circuit components.

It is another object of the present invention to provide such an access circuit which quickly and definitively selects one of a plurality of idle pieces of shared equipment to complete a connection to the same.

Still another object of the present invention is to provide such an access circuit which immediately transmits, to the status indication circuit associated with an idle piece of shared equipment, a signal which permits the status indication circuit to indicate that the shared equipment is busy.

A further object of the present invention is to provide such an access circuit which may be manufactured in printed circuit card form and which may be inexpensively and simply modified to provide access to any desired number of pieces of shared equipment.

BRIEF DESCRIPTION OF THE DRAWINGS

Other objects, features and advantages of the present invention will become apparent from the following description of a preferred embodiment, taken together with the attached drawings thereof, in which:

Referring now to FIG. 1, there are shown portions of a toll ticketing system, generally designated 20, utilizing an access circuit constructed in accordance with the present invention. The toll ticketing system 20 includes a plurality (for example, forty) recording trunks **22*a*–22*n* each of which is arranged to be connected via any one of a plurality of its respective incoming lines 24*a*–24*n* to a telephone toll call and to centralize the processing of the connected toll call. Each recording trunk 22*a*–22*n* is connected to automatic toll call billing equipment designated 26. The toll ticketing system 20 has a plurality of (for example, three) multifrequency detector (MFD) circuits 28*a*–28*x* which are arranged to receive tone signals from external toll equipment, a plurality of (for example, six) toll pulse acceptor (TPA) circuits 30*a*–30*y* which are arranged to receive locally dialed local toll pulse signals and a plurality of (for example, two) operator number identification (ONI) link circuits 32*a*–32*z*** which are arranged to connect the toll call to an operator for identification of the calling line number.

MFD circuits **28*a*–28*x*, TPA circuits 30*a*–30*y* and ONI link circuits 32*a*–32*z* are generally utilized only briefly during any telephone call. Therefore, those circuits may be provided in smaller quantities than the number of recording trunks 22a–22n which are required for a particular toll ticketing system 20. In addition, for reasons of economy, each MFD circuit 28a–28x, TPA circuit 30a–30y and ONI link circuit 32a–32z may be shared by more than one recording trunk 22a–22**n.

Each recording trunk 22a–22n is provided with a first relay access circuit 34a–34n which is arranged to connect its respective recording trunk 22a–22n to one or more of the MFD circuits 28a–28x via one of its respective set of outgoing lines 36a–36n, a second relay access circuit 38a–38n which is arranged to connect its respective recording trunk 22a–22n via one of its respective set of outgoing lines 40a–40n to one or more of the TPA circuits 30a–30y and a third relay access circuit 42a–42n which is arranged to connect its respective recording trunk 22a–22n via one of its respective set of outgoing lines 44a–44n to one or more of ONI link circuits 32a–32z. (The access circuits described herein are relay access circuits which utilize relays to perform the switching to complete desired connections. It will be appreciated by those skilled in the telephony art that, although the following description relates to relay access circuits, other types of access circuits — for example access circuits which employ core wound sensors — may be employed within the context of the present invention.)

Although each recording trunk 22a–22n has been shown, for the purposes of illustration, as having one each of relay access circuits 34a–34n, 38a–38n and 42a–42n (all of access circuits 34, 38 and 42 may be identical) it should be appreciated that depending upon the particular type of access circuit utilized (for example, an "access two" circuit which permits the recording trunk 22a–22n to be connected to either of two pieces of shared equipment of any given type) and depending upon the requirements of the particular toll ticketing system 20, more than one of each of access circuits 34a–34n, 38a–38n, or 42a–42n may be connected to a particular recording trunk 22a–22n to provide access to a greater number of pieces of shared equipment of a particular type. Furthermore, any particular shared piece of equipment generally may be accessed by different access circuits, which are connected to different recording trunks 22a–22n.

Figure 1:
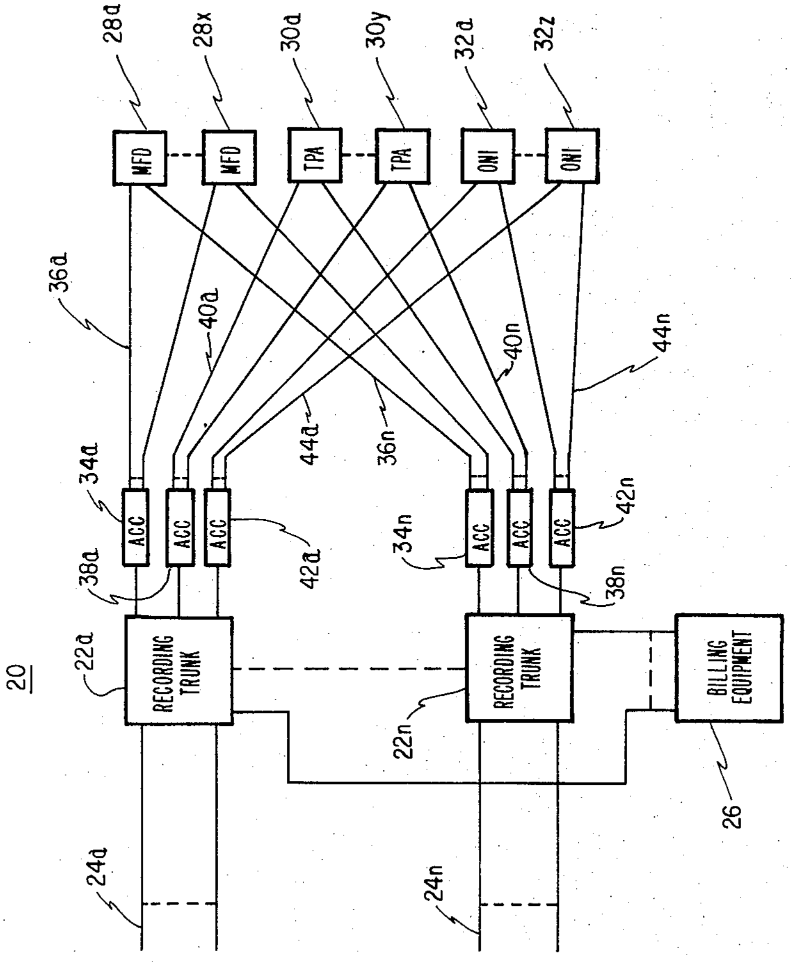
FIG. 1 is a block diagram of portions of a toll ticketing system in which an access circuit constructed in accordance with the present invention is utilized.
Figure 2:
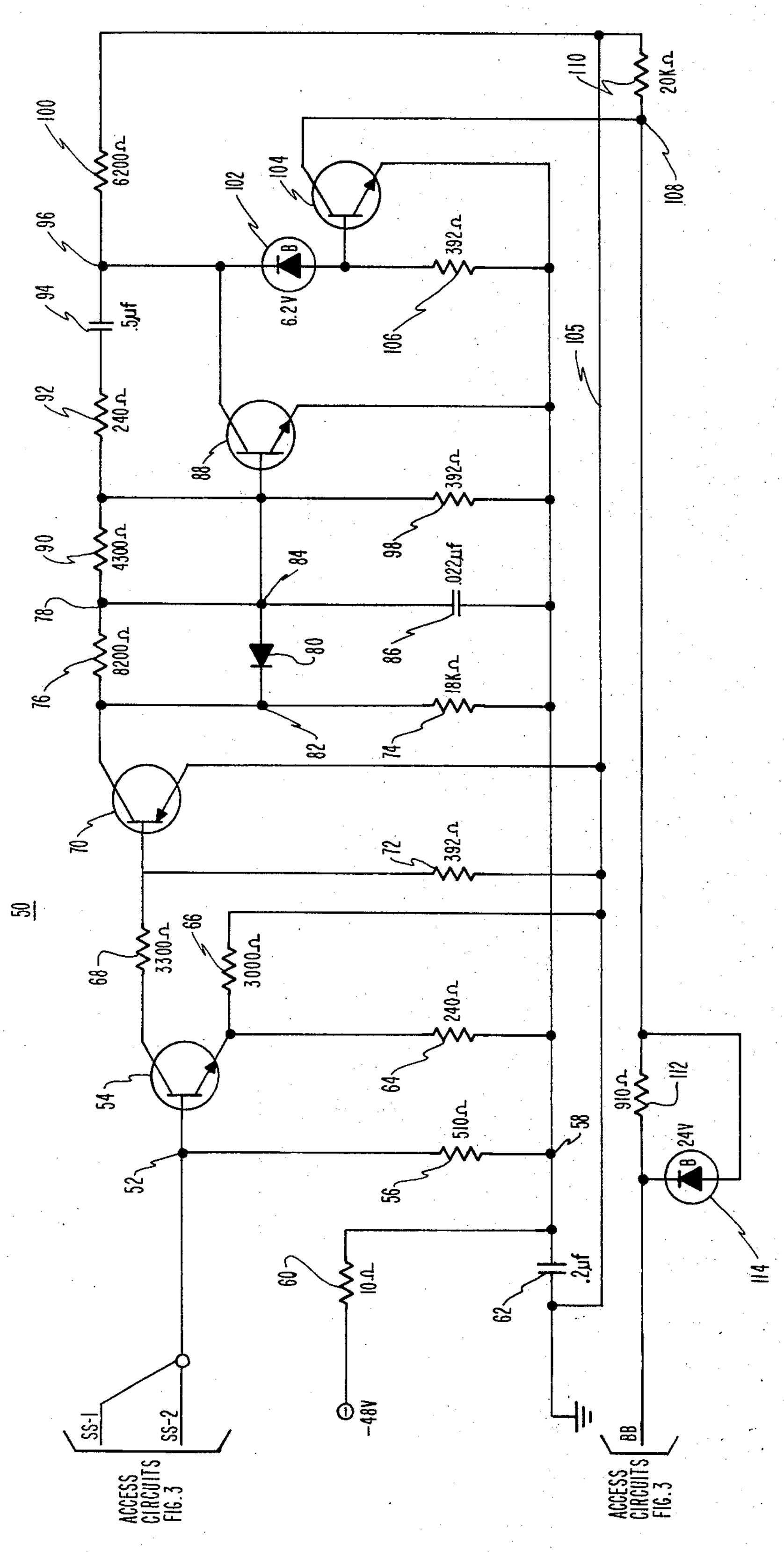
FIG. 2 is an electrical schematic wiring diagram of a shared equipment status indication circuit which may be utilized with the access circuit of the present invention.

Referring now to FIG. 2, there is shown a status indication circuit, generally designated 50, which is provided in each of the MFD's 28a–28x, the TPA's 30a–30y and the ONI links 32a–32z. Each of the status indication circuits 50 is arranged to be sampled or tested via one or more lines SS which are connected between the relay access circuits 34, 38, or 42 corresponding to the recording trunks 22a–22n which may utilize the piece of shared equipment with which the particular status indication circuit 50 is associated. For simplicity in explanation, only lines SS–1 and SS–2 are shown connected to the status indication circuit 50 in FIG. 2. Lines SS–1 and SS–2 are connected to a junction 52 which is directly connected to the base electrode of a ("threshold") transistor 54 and is connected via a resistor 56 to a junction 58. The junction 58 is connected via a resistor 60 to a –48 volt battery supply and via a capactor 62 to ground. The emitter of the threshold transisotr 54 is connected via resistor 64 to the junction 58 and via a resistor 66 to ground, and the collector of the threshold transistor 54 is connected via a resistor 68 to the base of an ("amplifier") transistor 70. The base of the amplifier transistor 70 is also connected via a resistor 72 to ground and the emitter of the amplifier transistor 70 is directly connected to ground. The collector of the amplifier transistor 70 is connected via a resistor 74 to the –48 volt supply and via a resistor 76 to a junction 78. A diode 80 is connected in parallel with the resistor 78 between junctions 82 and 84. The junction 84 is connected via a capacitor 86 to the –48 volt supply and is directly connected to the base electrode of an ("inverter") transistor 88. The junction 78 is also connected via a resistor 90 to the base of inverter transistor 88 and via a resistor 92, a capacitor 94 and a junction 96 to the collector of the inverter transistor 88. The base of the inverter transistor 88 is connected via a resistor 98 to the –48 volt supply, and the emitter of the inverter transistor 88 is directly connected to the –48 volt supply. The junction 96 is connected as shown and connected via a resistor 100 to ground and via a zener diode 102 (having a 6.2 volt breakdown voltage) to the base electrode of a ("switching") transistor 104. The base of the switching transistor 104 is connected via a resistor 106 to the –48 volt supply. The emitter of the switching transistor 104 is directly connected to the –48 volt supply, and the collector of the switching transistor 104 is connected via a junction 108 and a resistor 110 to ground. The collector of the switching transistor 104 is also connected via the junction 108 and a resistor 112, having a zener diode 114 (with a 24 volt breakdown voltage) connected in parallel therewith, to a lead designated BB (and discussed in greater detail below) which is connected to the corresponding relay access circuit(s) 34, 38, or 42.

Figure 3:
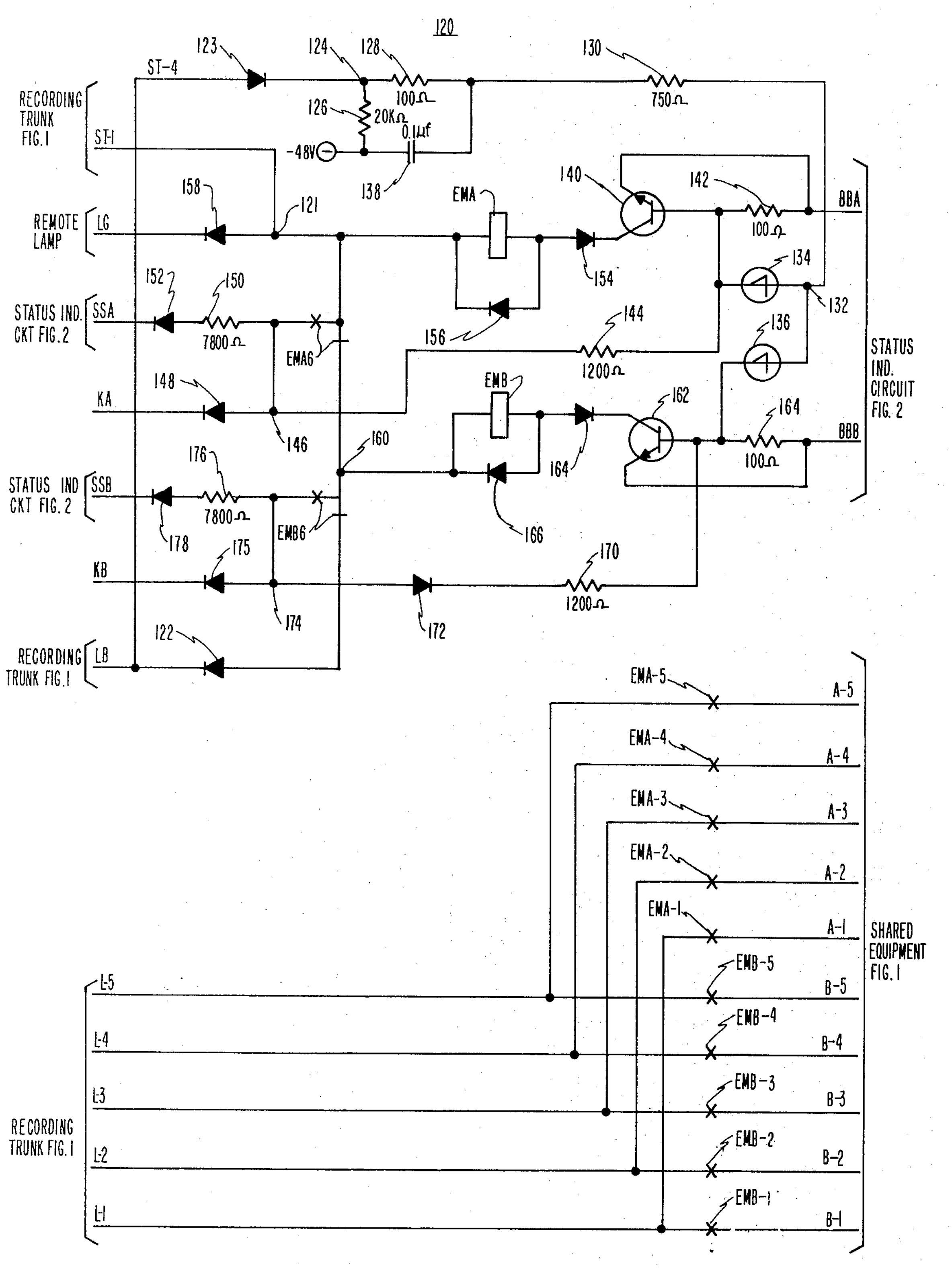
FIG. 3 is an electrical schematic wiring diagram of an access circuit constructed in accordance with the present invention.

Referring now to FIG. 3, the connection of a typical relay access circuit, generally designated 120, will now be described in greater detail.

The relay access circuit 120 which is shown is of the "access two" variety — i.e., the relay access circuit 120 is responsive to a request for service from the recording trunk 22a–22n to which it is connected to test, or sample, the busy-idle status of two status indication circuits (corresponding to two pieces of shared equipment of a particular type) to which it is connected and, if one or both of the status indication circuits indicate that its respective piece of shared equipment is idle, to complete an almost instantaneous connection between its respective recording trunk 22a–22n and an idle piece of shared equipment. Advantageously, the relay access circuit 120 is provided in the form of a printed circuit card (or portion of a printed circuit card) and because of inherent differences between components mounted on the card (as will be discussed in greater detail below) the relay access circuit 120 insures that, if more than one status indication circuit 50 indicates that its associated piece of shared equipment is idle, a connection will be completed between the recording trunk 22a–22n and only one of the idle pieces of shared equipment. Furthermore, it will be readily appreciated from the following discussion that with minor modifications and/or duplication of portions of the circuitry shown in FIG. 3, the relay access circuit 120 may be converted to a circuit of the "access n" type ($n>1$) where particular system requirements so dictate. The relay access circuit 120 has an input line ST–1 from the recording trunks 22a–22n to which it is connected and the input line ST–1 is connected via a junction 121 normally closed contacts EMA–6, a junction 160, normally closed contacts EMB–6 and a diode 122 directly to an output line LB to the recording trunk **22*a*–22*n* and to a line ST–4 which is connected via a diode 123, to a junction 124. A –48 volt supply is connected via a resistor 126 to the junction 124 and the junction 124 is connected via a resistor 128 and a resistor 130 to a junction 132 which in turn is connected to the anodes of four layer diodes 134 and 136 each of which has a firing voltage of approximately 39 volts. A capacitor 138 is connected in parallel with the resistors 126 and 128 and the resistor 128 and the capacitor 138 define a wave shaping circuit for input pulses transmitted via input line ST–4 from the associated recording trunk 22*a*–22*n* after the pulses have been passed through the loop between lines ST–1 and LB. The cathode of the four layer diode 134 is connected directly to the base electrode of a transistor 140 and via a resistor 142 to a first input line BBA (from one of the two status indication circuits 50 connected to the relay access circuit 120). The emitter of the transistor 140 is directly connected to the input line BBA. The cathode of the four layer diode 124 is also connected via a resistor 144 to a junction 146 and the junction 146 is connected both via a diode 148 to an output line KA and via resistor 150 and a diode 152 to an output line SSA which is connected to a status indication circuit 50 (and defines one of the SS input lines of FIG. 2). The collector of the transistor 140 is connected via a diode 154 to a relay EMA (having a diode 156 connected in parallel therewith) and the relay EMA is in turn connected to the input lead ST–1 via junction 121. The junction 121 is connected via a diode 158 to an output line LG which is connected to an indicating lamp (not shown) which may be utilized to provide a visual indication that a recording trunk 22*a*–22*n* has requested service. The relay EMA also has make and break contacts EMA–6 with the normally open contacts connected between relay EMA and the resistor 150 in output line SSA and with the normally closed contacts connected between the relay EMA and the junction 160**.

The circuitry associated with the second four layer diode 136 is substantially a duplication of the circuitry associated with the four layer diode 134 and is utilized to provide access to a different piece of shared equipment from that which may be accessed by the circuitry associated with four layer diode 134.

In particular, the cathode of the second four layer diode 136 is directly connected to the base electrode of a transistor 162 and via a resistor 164 to a second input line, designated BBB from a status indication circuit 50. The emitter of the transistor 162 is connected directly to line BBB and the collector of the transistor 162 is connected via a diode 166 to one side of a relay EMB (having a diode 168 connected in parallel therewith). The other side of the relay EMB is connected to the junction 160.

The base of the transistor 162 is connected via a resistor 170 and a diode 172 to a junction 174 which is connected in turn via a diode 175 to an output lead KB. The junction 174 is also connected via a resistor 176 and a diode 178 to an output line SSB which is connected to a second status indication circuit 50. The relay EMB has make and break contacts EMB–6 with the normally open contacts connected between the junction 160 and the resistor 176 and the normally closed contacts connected between junction 160 and the diode 180 in the output line LB.

Each of the relay access circuits 120 has five input lines L–1 through L–5 connected to its associated recording trunk **22*a*–22*n* and ten output lines (designated A–1 through A–5 and B–1 through B–5) and the input lines L–1 through L–5 are arranged to transmit information from a recording trunk 22*a*–22*n* to a connected one of the two pieces of shared equipment which may be accessed by the relay access circuit 120. When a recording trunk 22*a*–22*n* has requested service and an associated relay access circuit 120 determines that one of the pieces of equipment (either A or B) is idle, either the relay EMA or the relay EMB is energized closing either contacts EMA–1 through EMA–5 or contacts EMB–1 through EMB–5, respectively, thereby effecting a connection between lines L–1 through L–5 and either lines A–1 through A–5 or lines B–1 through B–5, respectively, and completing the circuit from the recording trunk 22*a*–22*n*** to the connected piece of shared equipment.

In operation, when a piece of shared equipment is idle, the threshold transistor 54 in the associated status indication circuit 50 is biased off, switching transistor 104 is on, and a –48 volt potential is present on output lead BB of the status indication circuit. No current flows through resistor 112 and, therefore, zener diode 114 is switched off. Assuming initially that both of the status indication circuits 50 to which a relay access circuit 120 is connected are idle, the –48 volt potential is present on both of input leads BBA and BBB in FIG. 3 and therefore at the cathodes of four layer diodes 134 and 136. In the absence of a request for service from the recording trunk **22*a*–22*n* to which the relay access circuit 120 is connected, a –48 volt potential (from the battery supply shown in FIG. 3) is also present at the anodes of the four layer diodes 134 and 136** and, therefore, neither of the four layer diodes conducts.

When the recording trunk **22*a*–22*n* to which the relay access circuit 120 is connected requests service, the recording trunk 22*a*–22*n* transmits a ground pulse to the relay access circuit 120 via first input line ST–1. The ground pulse is transmitted to the lamp connected to line LG and via normally closed contacts EMA–6 and EMB–6 and line LB back to the recording trunk 22*a*–22*n* and simultaneously to line ST–4. The transmittal of the ground pulse back to the recording trunk 22*a*–22*n* provides an indication that the access circuit 120 has received the request for service and that the access circuit 120 has not already been utilized to complete a connection. If the access circuit 120 had already completed a connection to a piece of shared equipment, one of the relays EMA or EMB would have been operatively energized and one of the normally closed contacts EMA–6 and EMB–6 would be open, preventing transmittal of the ground pulse back to the recording trunk 22*a*–22*n*. The resistor 128 and the capacitor 138 filter the ground pulse present on line ST–4 and shape the pulse into a ramp-type (exponential) wave which is applied via resistor 130 and junction 132 to the anodes of four layer diodes 134 and 136. The voltage at the anodes of the four layer diodes 134 and 136 increases from –48 volts toward zero volts and when the anode voltage approaches –9 volts (i.e., when the voltage across one of the four layer diodes 134 and 136 reaches its firing voltage), one of the four layer diodes 134 and 136 fires. Four layer diodes 134 and 136** inherently have discrete differences in their respective firing voltages and the difference between the firing voltages is of sufficient magnitude so that when a ramp-type voltage is applied to the anodes thereof, one of the four layer diodes fires before the other of the four layer diodes.

Assuming for the purposes of illustration that four layer diode 134 fires first, transistor 140 is immediately forward biased and current immediately begins to flow through the relay EMA. In addition current immediately flows through resistors 128 and 130, four layer diode 134 and resistor 142 via lead BBA to the BB lead in the connected status indication circuit 50. This current flow almost immediately generates a voltage drop across resistor 112 in the status indication circuit 50 and that voltage drop increases until the zener diode 114 fires and the potential of the BB lead is quickly lowered to and subsequently maintained at −24 volts by zener diode 114. As will be apparent to those skilled in the telephony art, the potential present on the BB lead in the status indication circuit 50 is lowered to its "busy indication" level of −24 volts much more rapidly than has heretofore been the case, since the potential on the BB lead is not dependent upon the current drawn by one or more relay coils (which generally must become energized before the relay access circuit has completed a connection) in order to indicate that the status indication circuit has been seized. With the time required for the potential of the BB lead to drop from −48 volts to −24 volts now reduced from the conventional duration 15 to 20 milliseconds to a duration of the order of a maximum of 1 microsecond, the probability of an attempt by a second access circuit 120 to complete a connection to a busy piece of shared equipment (before the potential on the line BB of the associated status indication circuit 50 has been reduced to −24 volts) is virtually eliminated.

When the relay EMA becomes energized, the normally open (make) contacts of the pair EMA–6 close and a ground pulse is applied via the resistor 150 and diode 152 to an SS input lead to the status indication circuit 50. The ground pulse is also applied via junction 146 and the resistor 144 to the cathode of four layer diode 134 and to the base of transistor 140 and via junction 146 and diode 148 to the lead KA. The normally closed (break) contacts of the pair EMA–6 open and remove the ground pulse from input lead ST–4; however, the ground pulse applied to the base of the transistor 140 via resistor 144 maintains the transistor 140 in a conducting state. The ground pulse transmitted via the output lead KA may be utilized to energize an auxiliary relay — for example, to connect additional lines (in addition to the lines L–1 through L–5 shown in FIG. 3) between the recording trunk 22*a*–22*n* and the shared equipment.

When one of the shared pieces of equipment (for example an MFD circuit 28*a*–28*x*) is busy, a 7,800 ohm ground is presented to the status indication circuit 50 on a line SS from the relay access circuit 120 which has completed the connection thereto. The potential developed across the resistor 56 in status indication circuit 50 is insufficient to forward bias the base-to-emitter junction of the threshold transistor 54 which remains off. The inverter transistor 88 remains off and switching transistor 104 is maintained in an on state by the potential developed across the resistor 106. When the switching transistor 104 is on, the −48 volt supply is connected via the parallel combination of the resistor 112 and the zener diode 114 to the line BB and the voltage drop across the resistor 112 increases to 24 volts whereupon the zener diode 114 breaks down and the output potential of line BB is maintained substantially constant at −24 volts by zener diode 114.

Referring again to FIG. 3, if one of the status indication circuits 50 (to which a particular relay access circuit 120 is connected), is associated with a busy piece of shared equipment, the output potential on its output line BB (assumed here, for the purposes of explanation, to be connected to lead BBB in FIG. 3) will be −24 volts. When a recording trunk 22*a*–22*n* requests service, a ground pulse is applied via the loop defined by input line ST–1, the normally closed contacts EMA–6, and the normally closed contacts EMB–6 to line ST–4. The ground pulse is shaped by the resistor 128 and the capacitor 138 and is applied to the anodes of four layer diodes 134 and 136. If the shared equipment corresponding to the BBA lead is idle, the cathode of four layer diode 134 is at a potential of −48 volts; on the other hand, since the shared equipment corresponding to the BBB lead is assumed to be busy, the cathode of four layer diode 136 is at −24 volts. Therefore, four layer diode 134 fires long before four layer diode 136 approaches its firing potential and transistor 140 is switched on and relay EMA is energized, as described above.

In the event that two or more relay access circuits 120 attempt to complete a connection to a piece of shared equipment substantially simultaneously, two or more 7,800 ohm connections to ground are connected in parallel to the base of the threshold transistor 54 and the potential developed across resistor 56 is sufficient to forward bias the base-to-emitter junction of the threshold transistor 54 which is then switched on. The output of the threshold transistor 54 is amplified by the amplifier transistor 70 and inverted by the inverter transistor 88. The breakdown diode 102 is switched off and the switching transistor 104 is switched off. When the switching transistor 104 is switched off, the ground on line 105 is transmitted to the BB lead via the resistor 110 and the resistor 112. The ground present on the line BB (FIG. 2) is transmitted via the connected BBA or BBB lines (FIG. 3) of both access circuits and the cathodes of the respective four layer diodes 134 and 136 are at approximately ground potential. The shaped ground pulse applied via input lead ST–4 and the wave shaping circuit to the anodes of the respective four layer diodes fails to fire the four layer diode corresponding to the status indication circuit 50 which was simultaneously sampled, and the access circuits 120 either attempt to complete a connection to another piece of shared equipment to which they provide access or make another attempt to complete a connection via the previously simultaneously seized status indication circuit 50. The likelihood of additional simultaneous attempts by both of the access circuits 120 to complete a connection to the same idle piece of shared equipment is extremely remote.

While the invention has been described with reference to a particular embodiment thereof, it will be apparent to those skilled in the art to which the invention pertains that various modifications in form and detail may be made therein without departing from the spirit and scope of the appended claims.

What is claimed is:

1. In a telephone system, an access circuit for completing a connection to shared call processing equipment when the shared equipment is idle, the shared equipment providing a first electrical output when the shared equipment is idle and a second electrical output when the shared equipment is busy, only the magnitude of the first electrical output being greater than a predetermined electrical output, and the shared equipment being responsive to a signal transmitted by the access circuit to provide the second electrical output, the access circuit comprising:

a first input terminal for receiving an electrical output from a first shared equipment;

a second input terminal for receiving an electrical output from a second shared equipment;

a third input terminal for receiving a signal requesting a connection to an idle shared equipment;

first switching circuit means connected between the third input terminal and the first and second input terminals and responsive to a signal requesting a connection on the third input terminal, and to an electrical output from a piece of shared equipment which is greater than the predetermined output to complete a connection to the shared equipment, and second switching circuit means, responsive to the signal requesting a connection, for transmitting a signal which is independent of the operations of the first switching circuit means to the shared equipment when the first switching circuit means initially responds to a first electrical output to complete a connection, the shared equipment to which the first switching means has begun to complete the connection responding to the transmitted signal to provide the second electrical output.

2. An access circuit as claimed in claim 1 wherein the first switching circuit means includes:

third switching circuit means connected to the second switching circuit means and responsive to the signal transmitted by the second switching circuit means to permit the first switching circuit means to initially respond to a first electrical output to complete a connection.

3. An access circuit as claimed in claim 1 wherein:

the first and second electrical outputs and the signal requesting a connection are first and second voltage signals and a voltage signal requesting a connection, respectively;

the first switching circuit means comprises first and second relays, each being connected between the third input terminal and a different one of the first and second input terminals, and the second switching circuit means comprises first and second threshold devices, each being connected between the third input terminal and a different one of the first and second input terminals, each of the threshold devices being responsive to a voltage signal requesting connection on the third input terminal and a first voltage signal on the other respective input terminal to which the threshold device is connected to transmit a voltage signal to the respective shared equipment by way of the respective input terminal and to the relay connected to the respective input terminal, and the voltage signal transmitted to the relay initially energizing the relay.

4. An access circuit as claimed in claim 3 wherein:

each of the threshold devices is inherently responsive to a slightly different threshold voltage level to transmit a voltage signal to its respective shared equipment by way of the respective input terminal to which the threshold device is connected, and the access circuit further comprises signal shaping circuit means connected between the third input terminal and the first and second threshold devices and being arranged to shape a voltage signal on the third input terminal requesting a connection, the shaped voltage signal permitting the threshold device having the smaller threshold voltage level to transmit a voltage signal to initially energize the relay which is connected to the same one of the first and second input terminals before the other threshold device reaches its threshold level when both the first and second shared equipment are idle.

5. An access circuit as claimed in claim 14 wherein the first and second threshold devices, respectively, comprise first and second four layer diodes.

6. An access circuit as claimed in claim 4 further comprising:

third switching circuit means responsive to a completed connection to a shared equipment for removing the voltage signal requesting a connection from the third input terminal and simultaneously applying the voltage signal requesting a connection to the input terminal for receiving a voltage signal from the connected shared equipment.

7. In a telephone system, an access circuit for completing a connection to shared call processing equipment when the shared equipment is idle, the shared equipment providing a first electrical output when the shared equipment is idle and a second electrical output when the shared equipment is busy, only the magnitude of the first electrical output being greater than a predetermined electrical output, the access circuit comprising:

a first input terminal for receiving an electrical output from a first shared equipment;

a second input terminal for receiving an electrical output from a second shared equipment;

a third input terminal for receiving a signal requesting a connection to an idle shared equipment;

first switching circuit means connected between the third input terminal and the first input terminal and responsive to receipt of a signal requesting a connection on the third input terminal and to an electrical output from the first shared equipment which is greater than the predetermined output to complete a connection to the first shared equipment;

second switching circuit means connected between the third input terminal and the second input terminal and responsive to receipt of a signal requesting a connection on the third input terminal and to an electrical output from the second shared equipment which is greater than the predetermined output to complete a connection to the second shared equipment;

first and second threshold circuit means, each bieng inherently responsive to a slightly different threshold level of the electrical output, the first threshold circuit means being connected between the third and the first input terminals and the second threshold circuit means being connected between the third and the second input terminals, and each of the first and second threshold circuit means being responsive to a signal requesting a connection to an idle shared equipment on the third terminal to initially energize a switching circuit means for connection to an idle shared equipment, and signal shaping circuit means connected between the third input terminal and the first and second threshold circuit means and being arranged to shape a signal on the third input terminal requesting a connection, the shaped signal permitting the threshold circuit means having the smaller threshold level to respond to initially energize its respective switching circuit means to complete a connection before the other threshold circuit means reaches its threshold level when both the first and second shared equipment are idle.

8. An access circuit as claimed in claim 7 further comprising:

third switching circuit means responsive to a completed connection to a shared equipment for removing the signal requesting a connection from the third input terminal and simultaneously applying the signal requesting a connection to the input terminal for receiving an electrical output from the connected shared equipment.

9. An access circuit as claimed in claim 7 wherein the first and second threshold circuit means, respectively, comprise first and second four layer diodes.

10. In a telephone system, an access circuit for completing a connection to shared call processing equipment when the shared equipment is idle, the shared equipment providing a first electrical output when the shared equipment is idle and a second electrical output when the shared equipment is busy, only the magnitude of the first electrical output being greater than a predetermined electrical output, and the shared equipment being responsive to a signal transmitted by the access circuit to provide the second electrical output, the access circuit comprising:

a first input terminal for receiving an electrical output from a first shared equipment;

a second input terminal for receiving an electrical output from a second shared equipment;

a third input terminal for receiving a signal requesting a connection to an idle shared equipment;

first switching circuit means connected between the third input terminal and the first input terminal and responsive to receipt of a signal requesting a connection on the third input terminal and to an electrical output from the first shared equipment which is greater than the predetermined output to complete a connection to the first shared equipment;

second switching circuit means connected between the third input terminal and the second input terminal and responsive to receipt of a signal requesting a connection on the third input terminal and to an electrical output from the second shared equipment which is greater than the predetermined output to complete a connection to the second shared equipment;

first and second threshold switching means, each being inherently responsive to a slightly different threshold level of the electrical output, the first threshold circuit means being connected between the third and the first input terminals and the second threshold circuit means being connected between the third and the second input terminals, and each of the first and second threshold circuit means being responsive to a signal requesting a connection to an idle shared equipment on the third terminal to initially energize a switching circuit means for connection to an idle shared equipment;

third switching circuit means, responsive to the signal requesting a connection, for transmitting a signal which is independent of the operations of the first switching circuit means and the second switching circuit means to the shared equipment when either of the first and second switching circuit means initially responds to a first electrical output to complete a connection, the shared equipment to which the one of the first and second switching circuit means has begun to complete the connection responding to the transmitted signal to provide the second electrical output, and signal shaping circuit means connected between the third input terminal and the first and second threshold circuit means and being arranged to shape a signal on the third input terminal requesting a connection, the shaped signal permitting the threshold circuit means having the smaller threshold level to respond to initially energize its respective switching circuit means to complete a connection before the other threshold circuit means reaches its threshold level when both the first and second shared equipment are idle.

* * * * *